US007057124B2

(12) United States Patent
Ieda et al.

(10) Patent No.: US 7,057,124 B2
(45) Date of Patent: Jun. 6, 2006

(54) PUSH SWITCH APPARATUS

(75) Inventors: Kiyokazu Ieda, Chiryu (JP); Eiji Mushiake, Chita-gun (JP); Takeshi Ito, Chiryu (JP); Kazuyoshi Mori, Chita (JP); Yuichi Murakami, Chiryu (JP); Noriyasu Onishi, Nishikasugai-gun (JP); Teruya Tomiyasu, Toyoto (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 149 days.

(21) Appl. No.: 10/827,345

(22) Filed: Apr. 20, 2004

(65) Prior Publication Data

US 2004/0262139 A1 Dec. 30, 2004

(30) Foreign Application Priority Data

Apr. 22, 2003 (JP) ....................................... 2003-117205
Apr. 22, 2003 (JP) ....................................... 2003-117214

(51) Int. Cl.

| | |
|---|---|
| ***H01H 9/06*** | (2006.01) |
| ***H01H 13/04*** | (2006.01) |
| ***H01Q 1/42*** | (2006.01) |
| ***E05B 1/00*** | (2006.01) |
| ***B60R 27/00*** | (2006.01) |

(52) U.S. Cl. .................... 200/61.62; 200/520; 292/347; 340/5.72; 343/872

(58) Field of Classification Search ... 200/61.62–61.93, 200/302.1, 302.2, 302.3, 520–572, 341, 600; 340/5.72; 292/347; 343/872
See application file for complete search history.

(56) References Cited

U.S. PATENT DOCUMENTS

| | | | | |
|---|---|---|---|---|
| 6,075,294 | A | 6/2000 | Van den Boom et al. | |
| 6,626,473 | B1 | 9/2003 | Klein et al. | |
| 6,696,652 | B1 | 2/2004 | Spies | |
| 6,768,070 | B1 * | 7/2004 | Lewison et al. | 200/302.2 X |
| 2003/0122556 | A1 | 7/2003 | Sueyoshi et al. | |

FOREIGN PATENT DOCUMENTS

| | | | |
|---|---|---|---|
| EP | 1 067 257 | A1 | 1/2001 |
| FR | 2 669 767 | A1 | 5/1992 |
| FR | 2 764 105 | A1 | 12/1998 |
| JP | 2000-182459 | | 6/2000 |
| JP | 2003-257274 | | 9/2003 |
| WO | WO 00/34604 | A1 | 6/2000 |
| WO | WO 00/70633 | A1 | 11/2000 |

* cited by examiner

*Primary Examiner*—James R. Scott
(74) *Attorney, Agent, or Firm*—Burns, Doane, Swecker & Mathis, L.L.P.

(57) ABSTRACT

A push switch apparatus includes a switch case adapted to be a base member, a switch mounted on the switch case, a switch cap made of an elastic material and supported on the switch case for covering the switch, a switch button supported by the base member and having an actuating portion for pushing the switch and an switch plate mounted on the switch case and arranged between the switch cap and the switch button. The switch plate having a contact surface contacts the switch button when the actuating portion of the switch button pushes the switch.

8 Claims, 8 Drawing Sheets

PUSH SWITCH APPARATUS

This application is based on and claims priority under 35 U.S.C. § 119 with respect to Japanese Application No. 2003-117205 filed on Apr. 22, 2003, and Japanese Application No. 2003-117214 filed on Apr. 22, 2003, the entire content of which is incorporated herein by reference.

FIELD OF THE INVENTION

This invention generally relates to a push switch apparatus, more particularly for provided with a vehicle door handle device of a vehicle door.

BACKGROUND OF THE INVENTION

A known push switch apparatus is disclosed in Japanese Patent Laid-Open Publication No. 2001-182459. The push switch includes a switch case, a switch, a switch cap and a switch button. The switch is arranged in a switch case. The switch cap is supported on the switch button and is fixed to the switch case. The switch cap cavers the switch for protects switch from a water. In such configuration, when the switch button is operates, the switch button pushes the switch through the switch cap. Therefore, the switch is generating a signal. However, the push switch is not considering a measure for releasing an excessive operation force relative to the switch, when the switch button is operates.

A need thus exit for a push switch includes a measure for releasing an excessive operation force.

SUMMARY OF THE INVENTION

In light of the foregoing, the present invention provides a push switch apparatus, which includes a switch case adapted to be a base member, a switch mounted on the switch case, a switch cap made of an elastic material and supported on the switch case for covering the switch, a switch button supported by the base member and having an actuating portion for pushing the switch and an switch plate mounted on the switch case and arranged between the switch cap and the switch button. The switch plate having a contact surface contacts the switch button when the actuating portion of the switch button pushes the switch.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

A preferred embodiment of the present invention will be described hereinbelow in detail with reference to the accompanying drawings.

Figure 1:
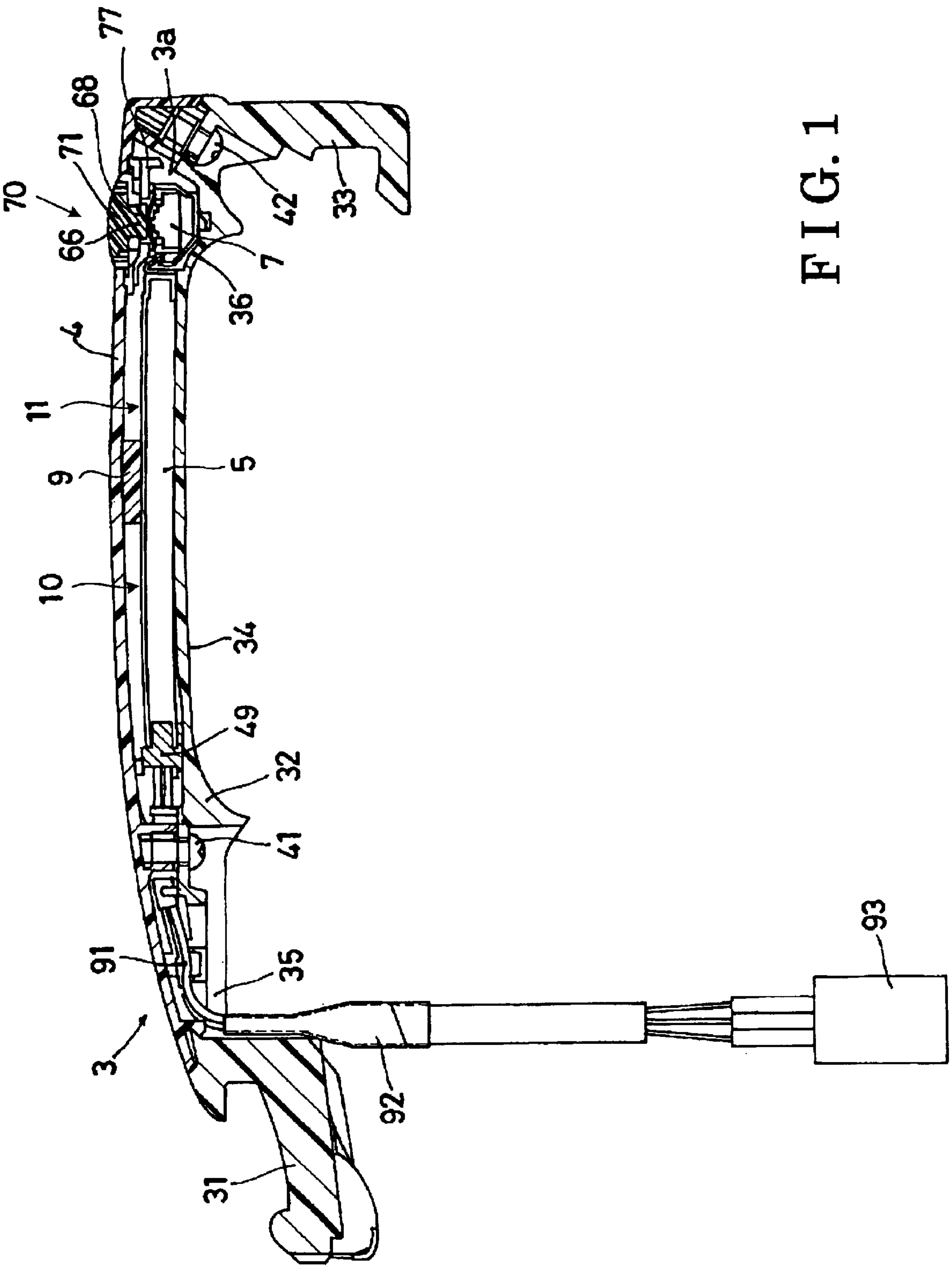
FIG. 1 illustrates a cross sectional view indicating an inner configuration of a vehicle door handle device according to an embodiment of the present invention.
Figure 2:
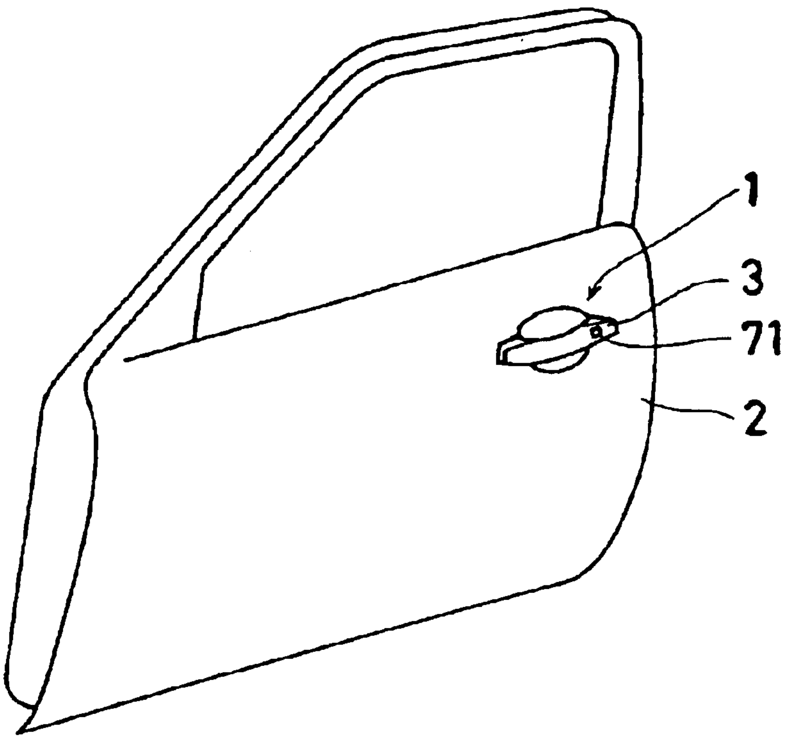
FIG. 2 illustrates a perspective view indicating a vehicle door at which the vehicle door handle device shown in FIG. 1 is assembled.
Figure 3:
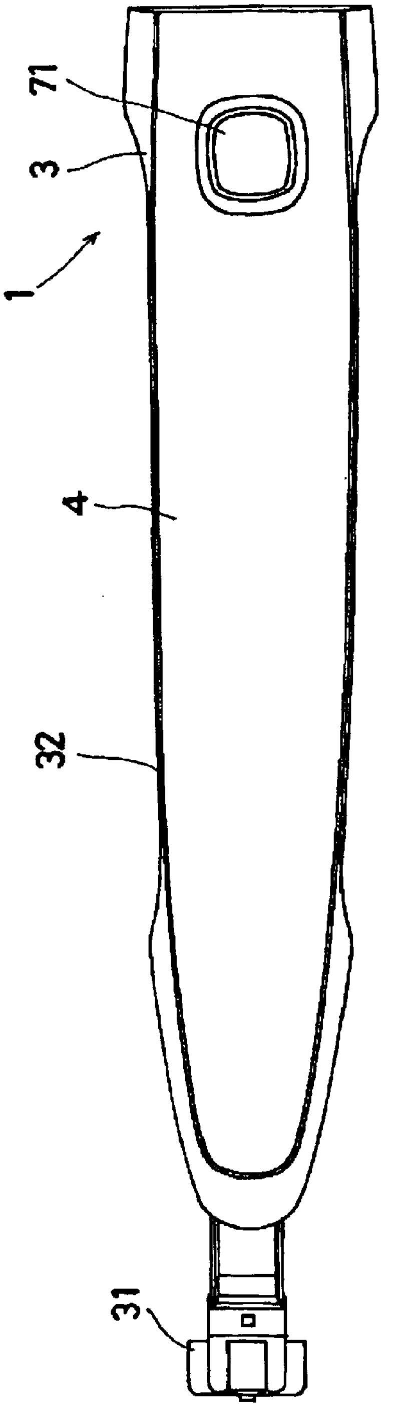
FIG. 3 illustrates a front view of the vehicle door handle device according to the embodiment of the present invention.

FIG. 1 illustrates a cross sectional view indicating an internal configuration of a vehicle door handle device 1. As shown in FIG. 2, the vehicle door handle device 1 is provided at the upper rear portion of a vehicle door 2 by which a user gets in or out of the vehicle, and the vehicle door handle device 1 includes an outside handle 3 (a handle body) being shaped as shown in FIG. 3.

As shown in FIG. 1 and 2, the vehicle door handle device 1 according to this embodiment of the present invention includes the outside handle 3 in which an antenna 5, a sensor electrode 6 (an operation detecting sensor) for detecting an operation of the outside handle 3 and a door switch device 70 (a push switch apparatus) for requiring a locking action of a door lock device (not shown) of the vehicle door 2 are housed.

The outside handle 3 includes a hinge portion 31, a main body 32, a limiting portion 33 and a handle cover 4. The hinge portion 31 for rotating a rear portion of the vehicle door 2 (the right side in FIG. 1) in the vehicle width direction positioning a fulcrum at a front portion of the vehicle door 2 (the left side in FIG. 1). The main body 32 including a housing portion 3*a* in which the antenna 5, the sensor electrode 6, the door switch device 70 and the like are housed. The limiting portion 33 being reverse L-shaped in the cross sectional view shown in FIG. 1 for limiting an rotation angle of the outside handle 32 not to be exceed equal to or more than a predetermined angle.

Further, a grip portion 34 being thin at the vehicle door side is formed at the main body 32. The housing portion 3*a* opening outwardly is covered by the handle cover 4 and designing surface of the vehicle door handle device 1. The handle cover 4 is made by a process of insert molding with two nuts inserted into a form block. The handle cover 4 is attached to the main body 32 by screwing screws 41 and 42 inserted through the main body 32 from the vehicle door side into the two nuts integrally formed at the handle cover 4.

As shown in FIG. 3, the front portion of the handle cover 4 becomes gradually narrower than the rear portion thereof.

The handle cover 4 having a switch button 71 of the door switch device 70 at the rear portion thereof.

Next, an inner configuration of the housing portion 3*a* formed at the main body 32 and components provided inside the housing portion 3*a* will be explained.

As shown in FIG. 1, the housing portion 3*a* formed along the longitudinal direction of the main body 32 of the outside handle 3 includes an opening 35 at front portion thereof being rectangular for guiding harnesses 91 into a compartment of the vehicle. In addition, a depressed portion 36 at which a cup-shaped switch case 76 of the door switch device 70 for housing a push-type switch 7 of the door switch device 70 is formed at the rear portion of the housing portion 3*a*. The depressed portion 36 is being more depressed toward the vehicle door side than a center portion of the housing portion 3*a*.

As shown in FIG. 1 and FIGS. 3 through 5, the door switch device 70 is positioned at a predetermined position of the depressed portion 36. A molding unit 10 is provided at approximately center portion of the housing portion 3*a*. The molding unit 10 includes a main unit portion 11, the door switch device 70 and the five harnesses 91. The molding unit 10 provided in the housing portion 3*a*.

The five harnesses 91 of the molding unit 10 is extending from one end of the main unit portion 11 of the molding unit 10. In addition, a grommet 49 is fitted at the harnesses 91 for water-proofing, a tube 92 is provided for bundling the harnesses 91, and a connector 93 is attached at the end of the harnesses 91 for water-proofing as shown in FIG. 1.

On condition that the molding unit 10 is provided at the housing portion 3*a*, the connecter 93 is penetrated through the opening 35 formed at the front portion of the main body 32 and extends inside of the vehicle door 2.

An external connector (not shown) is fitted at the connector 91 for transmitting signals to a control device (not shown). Such signals includes a lock requiring signal from the door switch device 70 provided at the housing portion 3*a* and a detecting signal indicating an electric capacitance between the sensor electrode 6 and the user, which is detected at the sensor electrode 6. At the control device, the condition of such signals are determined by a CPU provided in the controlling device, then a drive signal is transmitted to the antenna 5 provided inside the molding unit 10, and an electric wave (e.g. ID requiring signal) is transmitted to the outside of the vehicle (e.g. to the user having the portable station).

As shown FIGS. 7 through 14, a configuration of the molding unit 10 provided at the housing portion 3*a* will be described below. The door switch device 70 is connected to one end of the main unit portion 11, and the harnesses 91 are connected to the other end of the main unit portion 11. The main unit 11 includes the antenna 5, the sensor electrode 6 and a flexible circuit board 8, the switch 7 of the door switch device 70 is connected to the flexible circuit board 8. The flexible circuit board 8 being made of resin (polyurethane resin) and molded integrally with the antenna 5 and the sensor electrode 6.

A configuration of the antenna 5 will be described below. A ferrite 53 is housed in a rectangular solid antenna case 51 at which two faces are opened. The grommet 49 is attached to the one opening of the antenna case 51, and the ferrite 53 is inserted through the other opening. A coil 52 is winded on the antenna case 51 in a direction being perpendicular to the longitudinal direction of the antenna case 51 at a predetermined winding number. In this case, the coil 52 is winded at an approximately center portion relative to the longitudinal direction of the antenna case 51 and electrically connected to two terminals 54 attached to one end of the antenna case 51 and extending in the longitudinal direction of the antenna case 51. The antenna 5 outputs a predetermined electric wave (e.g. ID requiring signal) by applying the drive signal by the control device (not shown) and applying an electric current through the coil 52 winded on the antenna case 51. Thus, the antenna 5 works as an output antenna, however, such antenna 5 may additionally includes a function as a receiving antennal.

Figure 9:
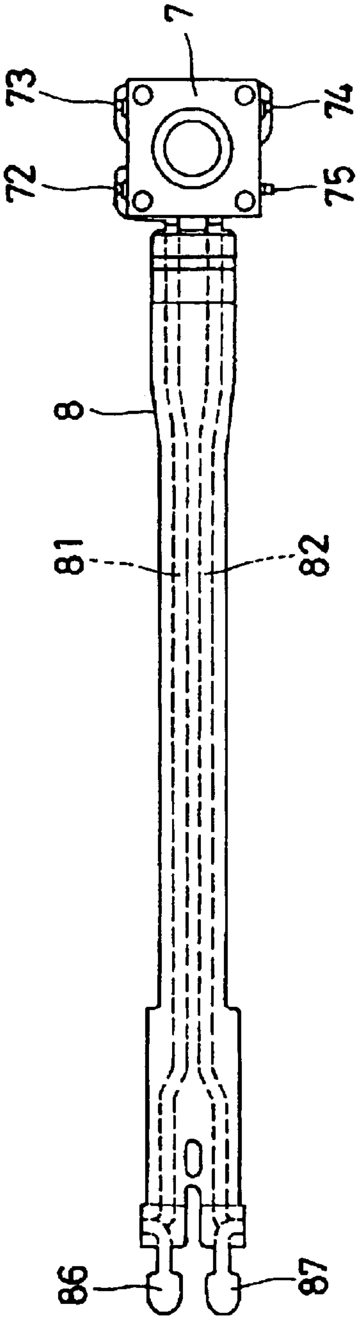
FIG. 9 illustrates a front view indicating a switch and a flexible circuit board before molded into the molding unit shown in FIG. 4.
Figure 10:
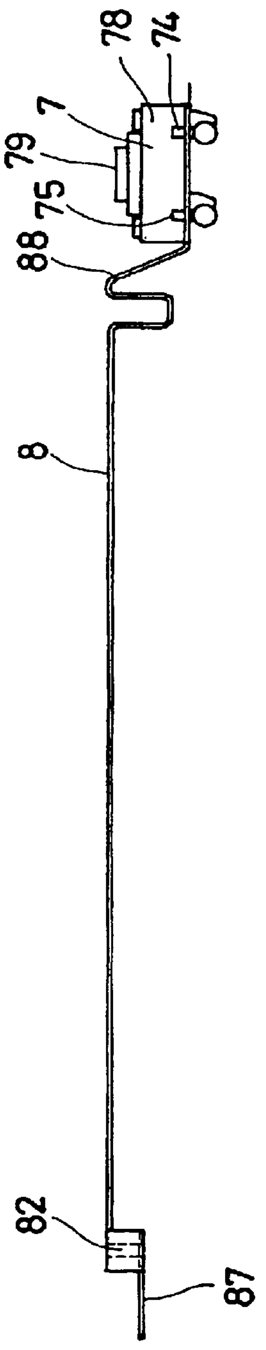
FIG. 10 illustrates a side view of the switch and the flexible circuit board show in FIG. 9.
Figure 11:
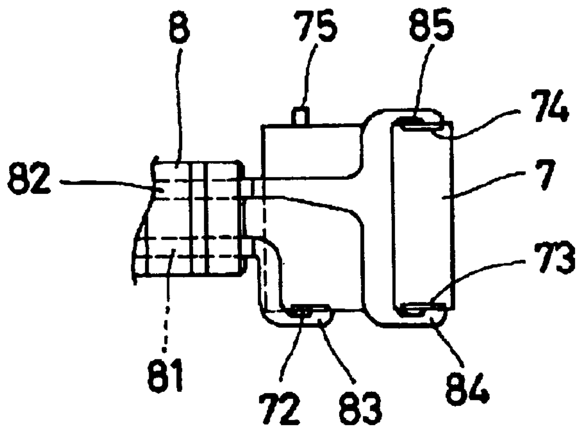
FIG. 11 illustrates a partial enlarged view indicating a electrically connecting portion between the switch and the flexible circuit board shown in FIG. 9.

A configuration of the switch 7 of the door switch device 70 will be explained below. As shown in FIGS. 9 through 11, the switch 7 including a switch main unit 78, a pressed portion 79, and four terminals 72, 73, 74 and 75 is electrically connected to the flexible board 8. The flexible board 8 includes conductive patterns 81 and 82 made of conductive material like tin. The conductive patterns 81 and 82 are integrally flattened by resin film such as polyethylene. The flexible board 8 also includes edge portions 83, 84, 85, 86 and 87 at which the conductive patterns 81 and 82 are exposed. As shown in FIG. 9, the exposed edge portions 86 and 87 on one side of the conductive patterns 81 and 82 are caulked at caulking portions thereof, then the two harnesses 91 are connected to the caulking portions by resistance welding. On the other hand, the edge portions 83, 84 and 85 on the opposite side of the conductive patterns 81 and 82 are connected to three terminals 72, 73 and 74 of the four terminals 72, 73, 74 and 75 by resistance welding as show in FIG. 11. Specifically, the edge portion 83 of the conductive pattern 81 is connected to the terminal 72 of the door switch device 70. The edge of the conductive pattern 82 on the switch side is bifurcated into two and forms an edge portions 84 and 85 at the back side of the door switch device 70, and the edge portion 84 is connected to the terminal 73 of the door switch device 70, and the edge portion 85 is connected to the terminal 74 of the door switch device 70. In this case, the terminals 72, 73 and 74 are connected by the resistance welding, however, the terminals may be connected electrically by soldering alternatively.

The end portions 86 and 87 of the flexible board 8 are bent in orthogonal direction relative to the longitudinal direction of the flexible board 8 to be like a pair of parentheses in cross sectional view of FIG. 10, so that the end portions 86 and 87 become terminals at which the harnesses 91 are caulked respectively. The flexible board 8 also includes an adjusting portion 88 at which the flexible board 8 is bent to be approximately S-shaped in FIG. 10 for adjusting the position of the door switch device 70 connected to the rear (right) portion of flexible board 8.

Figure 4:
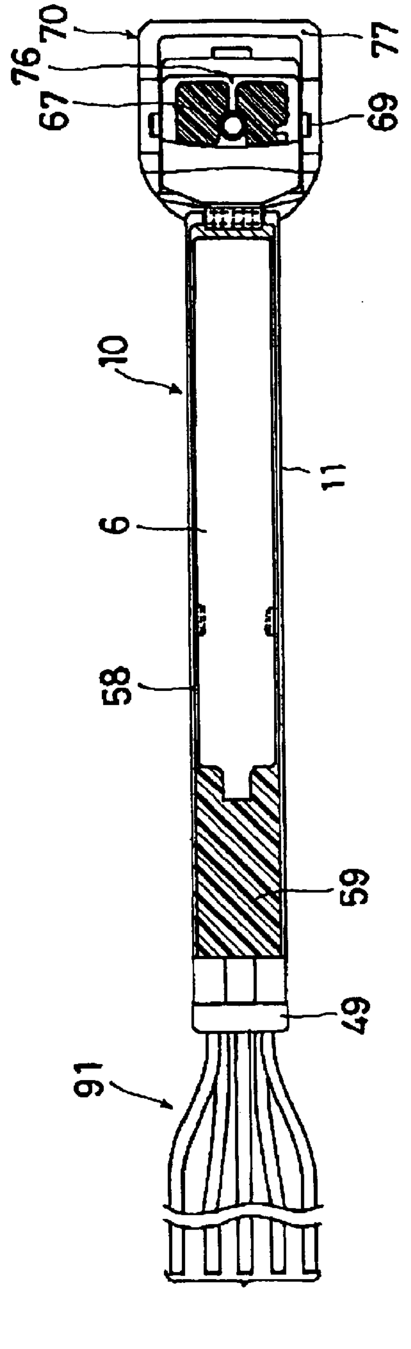
FIG. 4 illustrates a diagram indicating a molding unit provided inside the vehicle door handle shown in FIG. 3.
Figure 5:
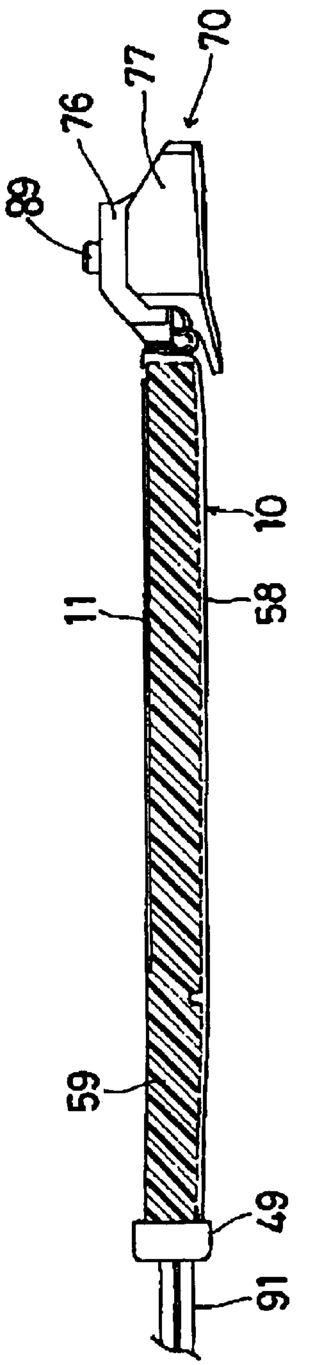
FIG. 5 illustrates a side view of the molding unit shown in FIG. 4.
Figure 6:
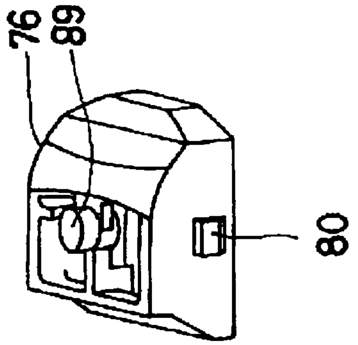
FIG. 6 illustrates a perspective view indicating a form of a switch case shown in FIG. 4.
Figure 7:
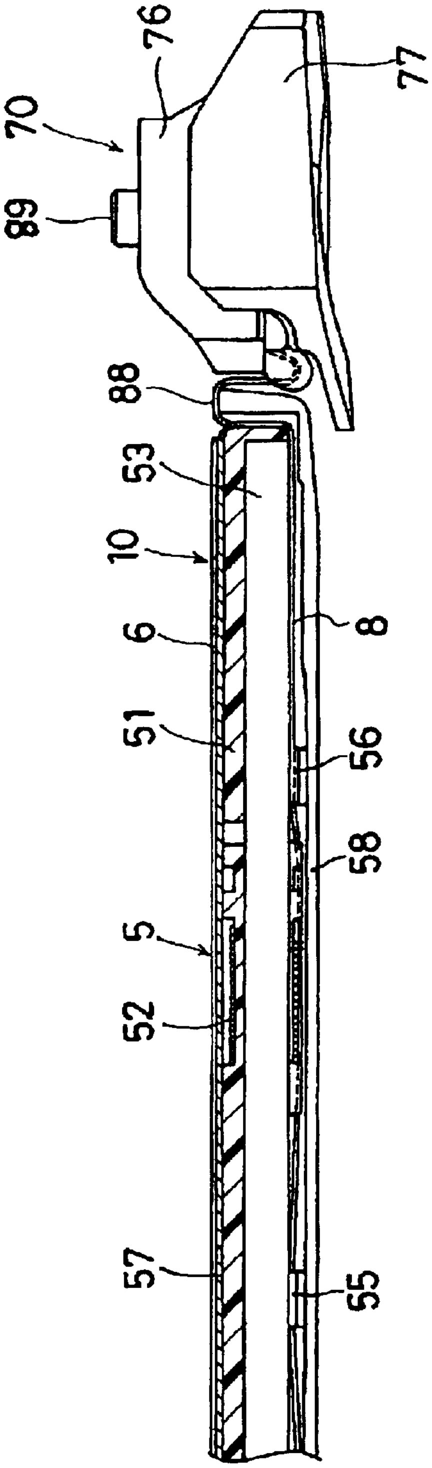
FIG. 7 illustrates a partial cross sectional view indicating an inner configuration of the molding unit shown in FIG. 5.
Figure 8:
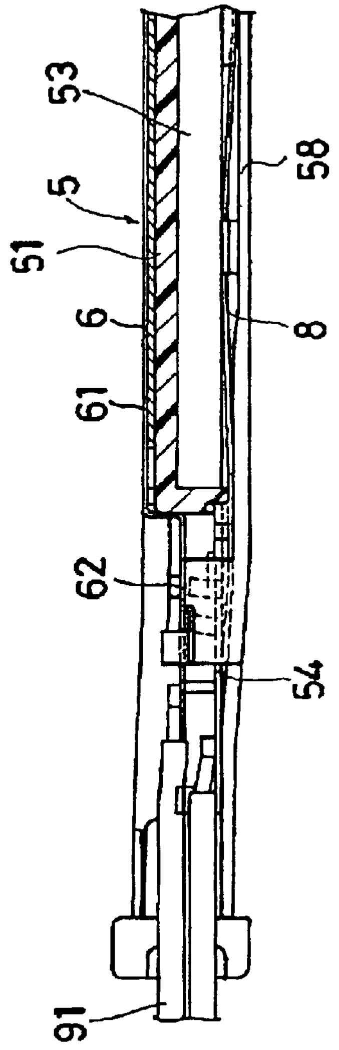
FIG. 8 illustrates a partial cross sectional view indicating a configuration of a connecting portion of a terminal of the molding unit shown in FIG. 7.

As shown in FIGS. 4 through 7 and FIGS. 12 through 14, the switch 7 is housed in the switch case 76 being shaped as show in FIG. 6. The switch case 76 includes two openings at the bottom portion thereof (upper portion in FIG. 6), and a cylindrical projecting portion 89 being projecting outwardly at the center portion of the bottom portion of the switch case 76 for positioning the switch case 76 relative to the depressed portion 36 formed at the housing portion 3*a* of the out side handle 3. Thus, the switch 7 is housed in the switch case 76 at a predetermined position. The switch case 76 also includes an opening at the opposite side where the two opening are provided, and the switch 7 is inserted through the opening from the above direction in FIG. 1. In addition, a switch cap 68 is fitted to the switch case 76 for covering the opening in order to dampproof the switch 7.

The center portion of the switch cap 68 being made of elastomer such as synthesized resin and rubber is thin, so that it is deformed being fitted into the switch case 76. In addition, a switch plate 77 (intermediate member) is fitted to the switch case 76 being covered by the switch cap 68. The switch plate 77 includes a depressed portion being approximately a cup-formed at which the switch case 76 is fitted. In this case, the switch case 76 including a pair of pawl portion 80 at both sides thereof as shown in FIG. 6 is integrally fixed to the switch plate 77 by the pawl portion 80 being fitted into a pair of groove-formed fitting portion 69 formed inside of the switch-plate 77. In such condition, polyurethane resin fills inside the switch case 76 through two openings formed at the bottom portion of the switch case 76 next to the projecting portion 89. The polyurethane resin fills around the switch main unit 78 of the switch 7 except the pressed portion 79, in other words the pressed portion is uncovered by the polyurethane resin. Thus, the connecting portion between the switch 7 and the flexible board 8 are fixed with the polyurethane resin.

As shown in FIGS. 1 through 14, the door switch device 70 is assembled as follows. First, the flexible board 8 is connected to the switch 7 shown in FIG. 9, then the switch case 76 and the switch cap 68 are assembled to the door switch device 70. Next, the pawl portion 80 of the switch case 76 is engages with the switch plate 77, thus the switch plate 77 is assembled to the switch case 76 to be a sub-assembly (sub-assay). The flexible board 8 of the sub-assay being engaged with the side surface of the ferrite 53 is engaged with two engaging portions 55 and 56 formed at the antenna case 51. Thus the flexible board 8 is fixed to the antenna case 51. The sensor electrode 6 is fixed to the opposite side of the bottom portion where the ferrite 53 of the antenna case 51 is housed by means of a double stick tape.

The sensor electrode 6 includes a rectangular detecting portion 61 provided along the longitudinal direction of the antenna case 51 and a terminal portion 62 continually extending from the detecting portion 61. A portion between the detecting portion 61 and the terminal portion 62 is bent to be crank-shaped, and the end portion of the terminal portion 62 further extends in the extending direction of the terminal 54 at which the end portion of the coil 52 is connected keeping a predetermined clearance therebetween. In this case, one of five harnesses 91 at which the grommet 49 is fitted is connected to the end portion of the terminal portion 62 of the sensor electrode 6 by resistance welding. Thus, the flexible board 8 at which the switch 7 is connected is fixed to the antenna case 51, then an assembly unit including an antenna case 51 at which the sensor electrode 6 is mounted is made, and the assembly unit is housed into a rectangular molding case 58 having an opening at one side thereof. Polyurethane resin 59 fills into the molding case 58 housing the assembling unit. In this way, the molding unit 10 being resin molded is formed by integrally molded the flexible board 8 including the door switch device 70 at the one end thereof, the antenna 5 and the sensor electrode 6. The grommet 49 if fitted at the harness side of the molding case 58 for preventing water coming into the molding case 58 from the periphery of the harnesses 91. As shown in FIG. 4 and FIG. 5, the resin 59 fills the connecting portion between the harnesses 91 and the molding unit 10 and around the antenna for securing the electrically connection of the connecting portion. In addition, the door switch device 70 is also filled with the resin as aforementioned before. The switch case 76 is filled with the resin 67 being same polyurethane sealing as the resin 59 through the two openings formed next to the cylindrical projecting portion 89 of the switch case 76. In this way, the switch main unit 78 of the switch 7 is fixed at the predetermined position inside the switch case 76, at the same time, the switch 7 is sealed for preventing water coming inside thereof.

The molding unit 10 having an aforementioned configuration is engaged with the bottom portion of the inner side of the grip portion 34 at the sensor electrode side thereof and provided inside the housing portion of the outside handle 3. The door switch device 70 is positioned by the projecting portion 89 of the switch case 76 being engaged with a positioning portion at the center of the depressed portion 36 formed at the housing portion 3*a* of the outside handle 3. Thud, the molding unit 10 is provided along the housing portion 3*a*.

A cushion material 9 is applied to the center portion of the molding unit 10 at the opposite side thereof where the sensor electrode 6 is provided. The switch button 71 made of rubber material includes an operating portion being approximately quadrangular-shaped and a boss portion 66 (actuating portion) at the lower center portion thereof in FIG. 1. The switch button 71 is assembled at the rear portion of the handle cover 4 from the vehicle door side.

The handle cover 4 at which the switch button 71 is fitted is assembled to the outside handle 3 for covering the opening of the housing portion 3*a* of the outside handle 3. The handle cover 4 is fixed to the main body 32 of the outside handle 3 by screwing the two screws 41 and 42 into the nuts integrally provided at the handle cover 4 from the vehicle door side of the outside handle 3. Thus, the vehicle door handle device 1 is configured with the outside handle in which the antenna 5, the sensor electrode 6, the door switch device 70 are integrally mounted.

An example of the operation of the vehicle door handle device will be explained as follows.

When the user approaches the vehicle and being within the predetermined area, the vehicle and the user becomes a transmittable condition. In such condition, the vehicle outputs a predetermined signal (e.g. ID requiring signal) to the portable station possessed by the user from the antenna 5 for requiring the portable station to output a signal. The portable station receives the signal from the vehicle and outputs an ID signal (various kinds of signals depending on each vehicle) to the vehicle. The vehicle receives the signal from the portable station and compares to information registered in advance. If the controlling device determined that the received ID signal is the registered ID (the user is qualified), the sensor electrode 6 detects whether or not the user demands operating the outside handle 3. In other words, generally the user puts their hand on the grip portion 34 of the outside handle 3 when the user opens or closes the vehicle door 2 (user demands operating), so that the sensor electrode 6 detects the user's intension to operates the vehicle door 2 depending on the electric capacitance between the user's hand an the sensor electrode 6. When the control device determines a distance between the user's hand and the sensor electrode 6 becomes within the predetermined range, the control device determines that the user intends to open the vehicle door 2 and actuates the door lock device to be unlocked.

On the other hand, when the user get out and close the vehicle door 2, the vehicle door 2 is locked by pressing the switch button 71 without inserting the key into the key cylinder provided at the vehicle door 2 and rotating it. Once the switch button 71 is pressed by the user, the boss portion 66 being integrally provided with the switch button 71 is pressed, then the switch cap 68 provided below the boss portion 66 in FIG. 1 is also pressed. The pressure applied to the switch cap 68 is also applied to the pressed portion 79 of the switch 7 provided below the switch cap 68. In this way, the pressed portion 79 is pressed. The contacting condition of the switch 7 is turned on or off depending on the number that the pressed portion 79 is pressed. When a signal indicating the contacting condition of the door switch device 70 is transmitted into the controlling device, the door lock device (not shown) is actuated depending on determined condition of the switch. Thus, the condition of the door lock device for prohibiting the open/close operation relative to the vehicle door 2 is locked.

Figure 12:
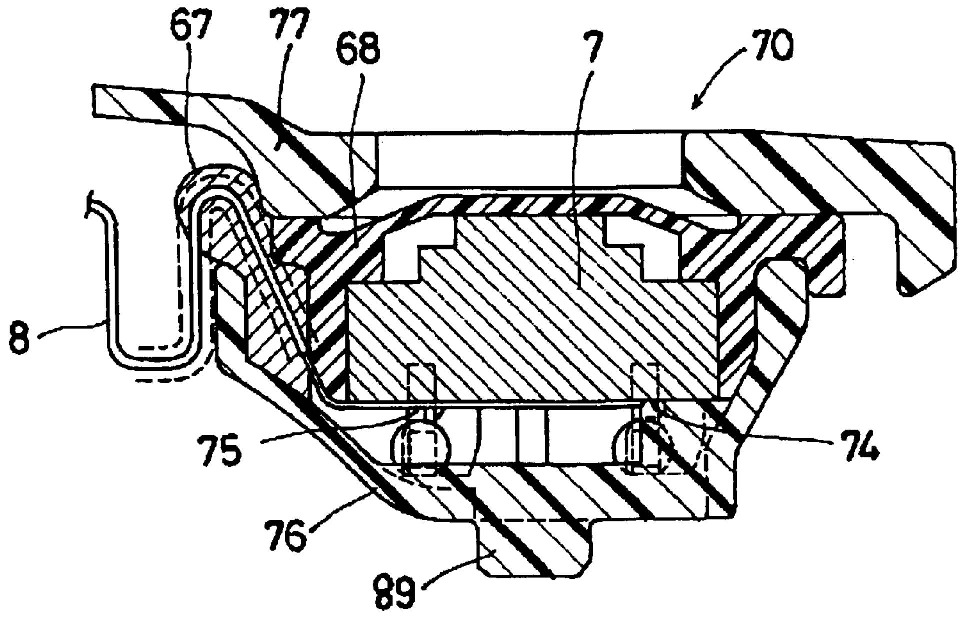
FIG. 12 illustrates a partial cross sectional view indicating an inner configuration of a door switch shown in FIG. 4.
Figure 13:
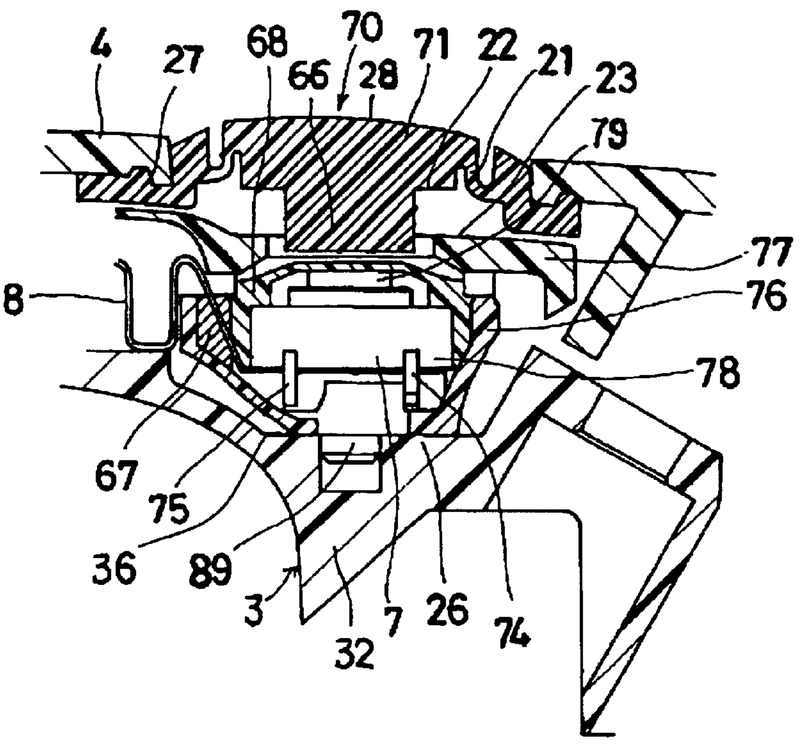
FIG. 13 illustrates an enlarged partial cross sectional view indicating an inner configuration of the door switch shown in FIG. 1.
Figure 14:
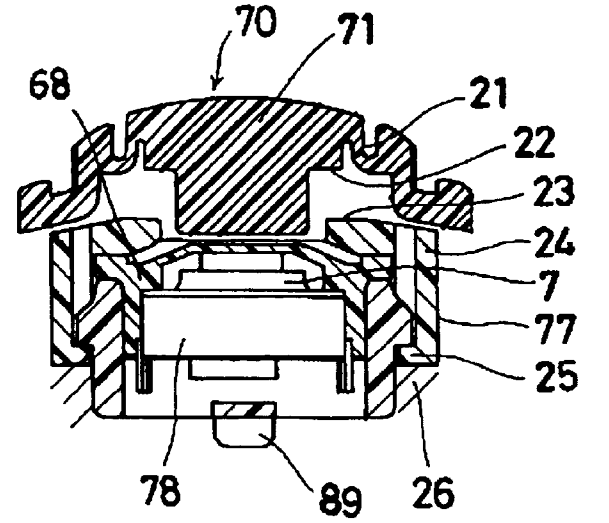
FIG. 14 illustrates a partial cross sectional view along a center line of the door switch showing an another aspect of the inner configuration of the door switch shown in FIG. 12.

As shown in FIGS. 12 through 14, the door switch device 70 is structured to transmit an excessive pressure applied to the switch button 71 to an outside handle 3 efficiently when a user strongly presses the switch button 71, the handle cover 4 being mounted to the main body 32 of the outside handle 3 includes the opening at the rear portion thereof, and the switch button 71 is fitted into the opening from the vehicle door side as shown in FIG. 13 and FIG. 14. The switch button 71 includes a fitting portion 27 being rectangular-formed and engaged with the handle cover 4, an operating portion 28 being thick and formed inside the fitting portion 27, a thin portion 21 provided between the fitting portion 27 and the operating portion 28, and the boss portion 66 provided at the lower portion of the operating portion 28 in FIG. 13. The boss portion 66 being projecting toward the switch side has a smaller diameter than the operating portion 28 has. Once the operating portion 28 of the switch button 71 is pressed, the boss portion 66 penetrates through an opening formed at the switch plate 77 and having larger diameter than the diameter of the boss portion 66. Then, a switch cap 68 is pressed by the boss portion 66, and the pressed portion 79 of the switch 7 is pressed, as a result, the switch 7 is actuated.

A surface of a switch case 76 at which the projecting portion 89 is formed engages with the bottom surface of the depressed portion 36 for positioning the switch case 76. The switch cap 68 is provided between the switch case 76 and the switch plate 77 for preventing water coming inside the switch case 76. When the operating portion 28 of the switch button 71 is pressed, the thin portion 21 of the switch button 71 is deformed, then the operating portion 28 of the switch button 71 can moved toward the switch side until a surface 23 of the switch plate 77 at which the opening is formed engages with a surface 22 being at inner side of the operating portion 28 of the switch button 71 as shown in FIG. 13.

Thus, when the user pressed the switch button 71, and excessive operation force being equal to or more than a predetermined load is applied to the operating portion 28, the boss portion 66 presses and actuates the pressed portion 79 of the switch 7, at the same time, the excessive operation force is applied to surface 23 provided at the peripheral edge of the opening formed at the switch plate 77 due to the engagement between the surface 22 of the operating portion 28 and the surface 23 of the switch plate 77. The excess load applied to the surface 23 is further applied to the peripheral portion of the switch cap 68 in the direction which the pressed portion 79 of the switch 7 is moved, then the excess load is applied to one end portion (at which the switch cap 68 is engaged) of the switch case 76. Because the switch case 76 is supported by the depressed portion 36 of the main unit portion 32, the excess load escapes to a load receiving portion 26 of the main unit portion 32 being engaged with the switch case 76.

In this case, the switch case 76 are fitted into the approximately cup-shaped depressed portion of the switch plate 77, and an outer peripheral edge of the depressed portion being cup-shaped works as a load loosing portion 24. In this way, a stroke of the operation of the operating portion 28 is limited by the switch plate 77 for protecting the switch 7 by preventing the excessive load applied to the pressed portion 79 of the switch 7 depending on the moving amount of the operating portion 28.

As aforementioned above, a range of movement of the operating portion 28 becomes equal to a range of movement of the surface 22 of the operating portion 28 until it engages with the surface 23 of the switch plate 77. When the operating portion 28 of the switch button 71 made of rubber is pressed and moved, a top end of the boss portion 66 of the switch button 71 firstly engages with the switch cap 68. As the operating portion 28 is further pressed, the switch cap 68 is deformed by the boss portion 66 being deformed due to the engagement. The movement of the operating portion 28 is stopped when the pressed portion 79 of the switch 7 is pressed to the deepest position. In such condition, a movable area in which the contacting state of the switch 7 is not damaged can be set based on a tolerance of the component of the door switch device 70.

Alternatively, it may be set in advance that the door lock device is locked or unlocked depending on the number that the switch button 71 is pressed. In addition, a predetermined time may be provided between the last operation of the switch button 71 and the locking or unlocking operation of the vehicle door 2.

In the embodiment of the current invention, the grip-type outside handle is used, however, the type of the outside handle is not limited to such configuration. A pull-up type outside handle may be used alternatively.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A push switch apparatus comprising:

a base member comprising a cover and a main body;

the cover and the main body defining a housing portion;

a switch case arranged in the housing portion and fixed to the main body;

a switch mounted on the switch case;

a switch cap made of an elastic material and supported on the switch case for covering the switch;

a switch button possessing an outer periphery fixed to the cover and also comprising an actuating portion for pushing the switch; and a switch plate mounted on the main body by way of the switch cap and the switch case, and positioned between the switch cap and the switch button; wherein, an operating force exceeding a predetermined value is transmitted from the switch button to the switch plate, and then transmitted to the main body, through the switch cap and the switch case.

2. The push switch apparatus according to claim 1, wherein the main body and the cover constitute a handle body, and the handle body is mounted on a vehicle door.

3. The push switch apparatus according to claim 2, wherein the handle body includes an antenna and an operation detecting sensor.

4. The push switch apparatus according to claim 3, wherein the switch is electrically connected with a flexible circuit board, a coil of the antenna is electrically connected with the flexible circuit board, and the operation detecting sensor is electrically connected with the flexible circuit board.

5. The push switch apparatus according to claim 1, wherein the switch button is made of rubber material and includes a fitting portion that is engaged with the handle cover.

6. The push switch apparatus according to claim 5, wherein the fitting portion is disposed between the cover and the switch plate.

7. The push switch apparatus according to claim 5, wherein the switch button is formed in a rectangular shape.

8. The push switch apparatus according to claim 1, wherein the actuating portion of the switch button is a boss portion.

* * * * *